Patented Jan. 11, 1949

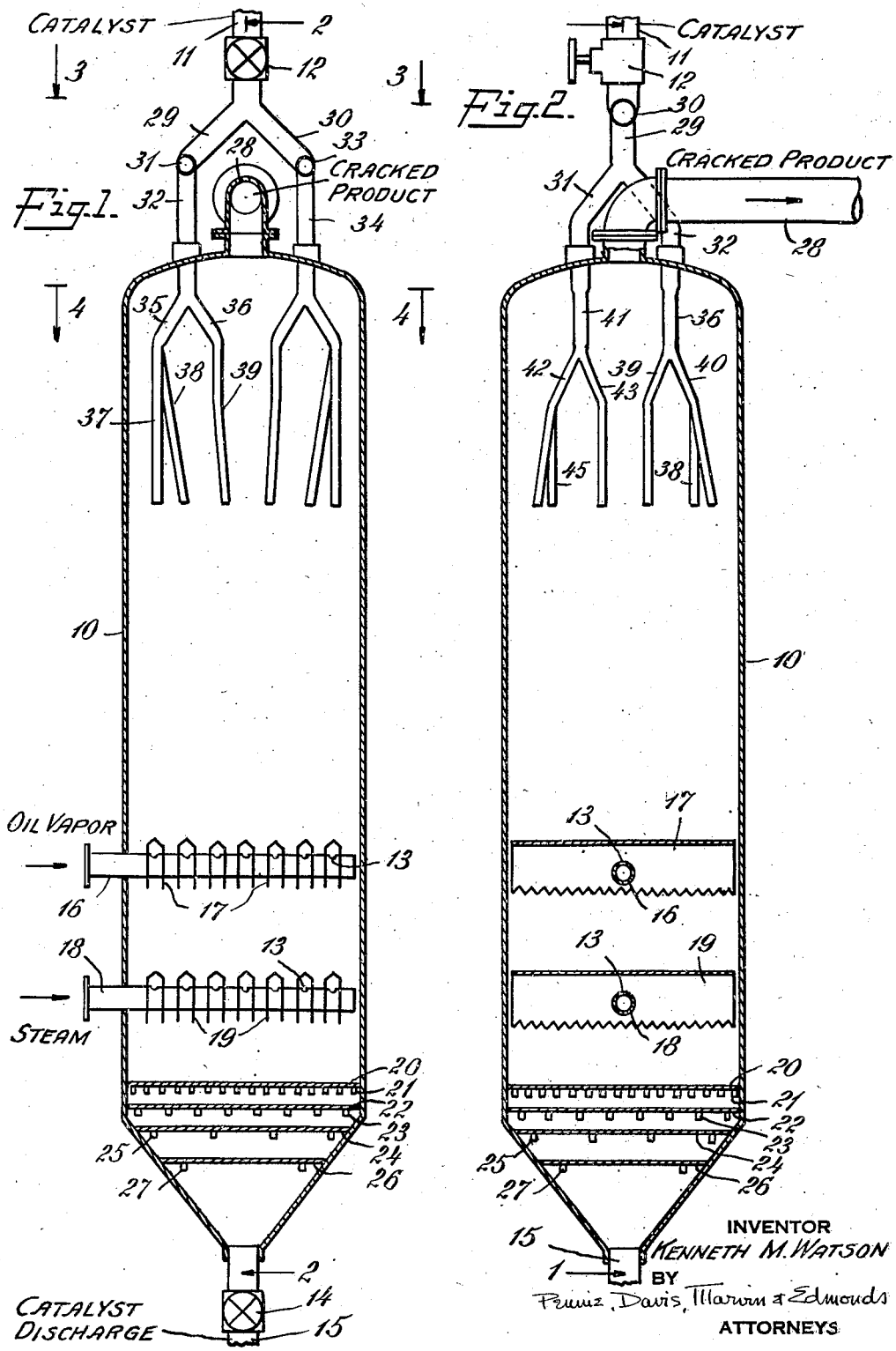
Jan. 11, 1949.  K. M. WATSON  2,459,056
GAS-SOLID CONTACTING APPARATUS
Filed Dec. 31, 1945  2 Sheets-Sheet 1
INVENTOR
KENNETH M. WATSON
BY
ATTORNEYS Jan. 11, 1949.  K. M. WATSON  2,459,056
GAS-SOLID CONTACTING APPARATUS
Filed Dec. 31, 1945  2 Sheets-Sheet 2
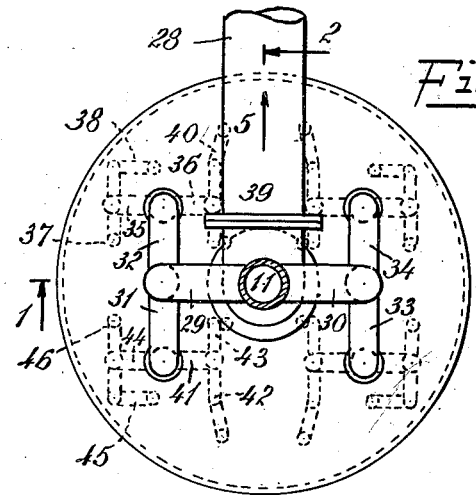
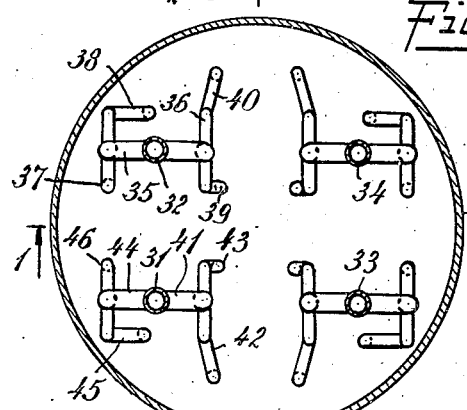
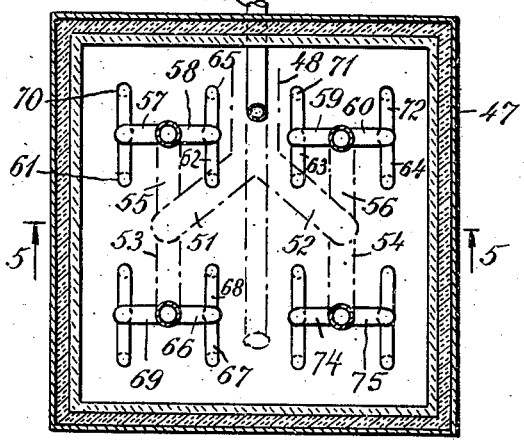
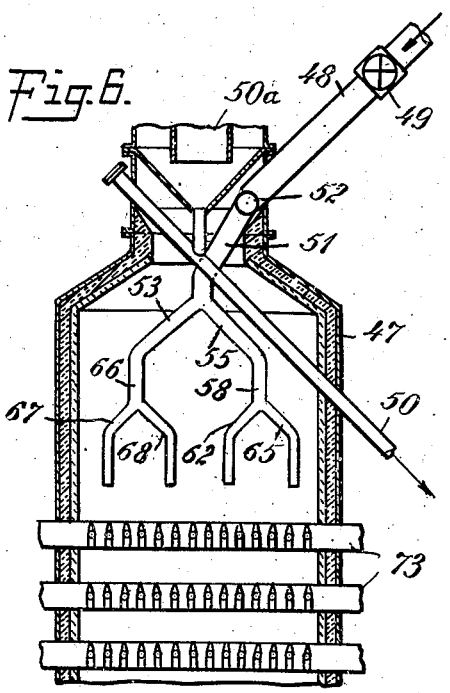
INVENTOR
KENNETH M. WATSON
BY
Prince, Davis, Marvin & Edmonds
ATTORNEYS

2,459,056

UNITED STATES PATENT OFFICE

2,459,056

GAS-SOLID CONTACTING APPARATUS

Kenneth M. Watson, Madison, Wis., assignor to Sinclair Refining Company, New York, N. Y., a corporation of Maine Application December 31, 1945, Serial No. 638,533

1 Claim. (Cl. 23—288)

My invention relates to improvements in apparatus for contacting a granular solid with an aeriform fluid, and more particularly to improvements in apparatus for catalytically cracking hydrocarbons in vapor phase and in apparatus for regenerating catalysts employed in such cracking operations.

My invention is most specifically concerned with apparatus of the type in which a charge of catalyst, as a granular solid, is moved downwardly through a reaction chamber, being charged to the upper part of the chamber and discharged from the lower part of the chamber as the operation continues, while the reacting fluid, hydrocarbon vapors to be cracked or air or a mixture of air and steam, for example, flow upwardly through the down-flowing body of catalyst.

Perhaps the primary requirement of such apparatus is uniformity of contact between the catalyst and the reacting fluid. In cracking reactors utilizing a granular catalyst passed downwardly therethrough, "channelling" of the hydrocarbon vapors involves increased carbon deposition on the catalyst in the regions through which the oil vapors pass at a low rate of flow. Such increased carbon deposition is undesirable, among other reasons, because it lessens the activity of the catalyst in these regions with resultant reduction in the yield and quality of the cracked product. In regenerating kilns operating on granular catalyst, "channeling" of the aeriform fluid through the catalyst involves either overburning of part of the catalyst or underburning of part of the catalyst or both with resultant loss of effective catalytic activity and sometimes with destruction of overburned parts of the catalyst. Non-uniform distribution of the regenerating fluid impairs the efficiency of utilization of its oxygen content and also involves non-uniform distribution of heat in the kiln with consequent local overheating and local underheating.

The problem above reflected has long been recognized. Much effort has been devoted to it. But, in terms of apparatus of substantial proportions, it has not hitherto been satisfactorily solved.

By "channelling" above, I mean non-uniform fluid flow such that, instead of uniform upward flow across the chamber, the relative flow through some sections is greater than through others. "Channelling" is the result of part of the charge of granular solid in the chamber offering less resistance to flow than other parts. Since resistance to fluid flow on the part of granular particles is a function of size of the granules, i. e. the larger the particles, the less will be the resistance to fluid flow, "channelling" can only occur where the fine and coarse particles of the granular solid are not equally distributed.

In accordance with the present invention, I substantially reduce "channelling" and its undesirable effects by providing in conjunction with baffling means near the bottom of the reaction chamber, such means being adapted to maintain the rate of downward flow of the granular solid substantially uniform across the chamber, means in the upper portion of the chamber which operate to distribute the incoming granular solid over the chamber in such a way as to minimize any tendency of the granular solid to classify itself with the formation of paths offering varying resistance to fluid flow.

My invention will be described with the aid of the accompanying diagrammatic drawings in which, Fig. 1 is a sectional elevation of a cracking reactor comprising my invention, the section being taken on line 1—1 of Figures 2, 3 and 4;

Fig. 2 is a section taken on line 2—2 of Figures 1, 3 and 4;

Fig. 3 is a section taken on line 3—3 of Fig. 1;

Fig. 4 is a section taken on line 4—4 of Fig. 1;

Fig. 5 is a sectional elevation, on line 5—5 of Fig. 7, illustrating my invention as applied to a regenerating kiln, only the upper portion of the kiln being shown;

Fig. 6 is a section on line 6—6 of Figures 5 and 7; and

Fig. 7 is an enlarged section on line 7—7 of Fig. 5.

Referring now particularly to Figures 1 and 2, the numeral 10 denotes a casing of any suitable material of construction delineating a reaction chamber into which granular catalyst is introduced from pipe 11, controlled by valve 12, and from which spent catalyst is discharged by connection 15, controlled by valve 14. Hydrocarbon oil vapors to be cracked are fed to the chamber through beam duct 16 having associated therewith troughs 17 for distributing the oil vapors uniformly across the chamber. Duct 16 and troughs 17 communicate through apertures 13 in the duct. To facilitate flow of catalyst through the passageways formed by adjacent troughs and also to reduce wear of the troughs, the tops thereof are peaked or gabled. Intermittent hold-up and release of catalyst in the passageways, undesirable as giving rise to pulsating catalyst flow, is largely obviated by the serrations along the edges of the troughs, shown in Fig 2.

Below the grid formed by beam duct 16 and its associated distributing troughs 17, is a second grid constituted of beam duct 18, similar in construction to duct 16, and of distributing troughs 19, which may conform in all respects with troughs 17. Steam introduced through the duct 18 and distributed by the troughs 19 across the chamber serves to strip the downwardly flowing catalyst of vaporizable materials. The stripped catalyst collects on baffle 20 provided with discharge ports 21. From this baffle it passes continuously and successively to baffle 22 equipped with discharge ports 23, baffle 24 equipped with discharge ports 25, and baffle 26 equipped with discharge ports 27. The cumulative effect of the several baffles is to maintain uniform rates of flow of catalyst throughout the cross section of the chamber above the uppermost grid.

Cracked hydrocarbons, steam, and any uncracked material are withdrawn from the chamber as a vapor mixture via pipe 28, which may extend to a cyclone separator, for example, by means of which catalyst fines are removed from the reactor product.

The temperature in the chamber may approximate, for example, 900°–975° F., while the pressure therein may approximate, for example, 6 to 10 pounds per inch gauge.

Pipe 11, from which catalyst is supplied to the chamber and which may be designated the primary catalyst supply pipe or tube, bifurcates, as shown, into sections 29 and 30 which in turn bifurcate or split into sections 31 and 32 and 33 and 34, respectively. Below the top of the reaction chamber each of the latter sections similarly branches into two sections. Thus, sections 31 and 32 (see Figs. 3 and 4), split into sections 41 and 44 and 35 and 36, respectively. These sections resulting from the bifurcation of sections 31—34 again split or branch with the formation, in the case of sections 35 and 36, of sections 37 and 48 and 39 and 40, respectively, and with the formation, in the case of sections 41 and 44, of sections 42 and 43 and 45 and 46, respectively.

The chamber of Figs. 1–4 being circular in cross section as is generally true with respect to reactors employed in the cracking of hydrocarbon oils using a granular catalyst, the terminal sections, i. e. the sections opening to the chamber, do not represent in every instance straight tubes, since some of them, sections 38, 39, 40, 42, 43 and 45, for example (see Fig. 4) must be bent or inclined in order that each terminal section will feed an equal cross-sectional area of the chamber. The lower ends of the terminal tubes which are in effect ports are advantageously disposed in substantially the same horizontal plane.

It is essential to the end that the ratio of fine particles to coarse particles in each of the two sections formed at each split will be at all times substantially the same during operation of the reactor, that the sections form equal angles to the horizontal plane. And this, of course, applies in the instance of chambers of square cross section as well as in the instance of chambers of circular cross section. It is not necessary, that each branching section be in the same plane as the sections depending therefrom, but the branching section should form equal angles with the two depending sections in all planes.

Referring now to Figs. 5–7, illustrating my invention as applied to a regenerating kiln, the numeral 47 indicates a casing delineating a chamber of square cross section containing grid members 73 and into which catalyst to be regenerated is introduced from pipe 48 controlled by valve 49. Pipe 48 bifurcates within the chamber as shown, into sections 51 and 52 which in turn bifurcate into sections 53 and 55 and 54 and 56, respectively. Pipe 50 straddled by sections 51 and 52 serves to transport coarse catalyst particles from an ellutriator 50a, only the bottom portion of which is shown, to a point outside the kiln.

Like sections 51 and 52, each of sections 53—56 branches or splits with the formation of two sections. Section 53 splits into sections 66 and 69, section 54 into sections 74 and 75, section 55 into sections 57 and 58, and section 56 into sections 59 and 60. The terminal sections are formed by the branching of these latter sections. Thus, terminal sections 67 and 68 are formed by the branching of section 66, terminal sections 62 and 65 by the branching of section 58, terminal sections 61 and 70 by the branching of section 57, terminal sections 63 and 71 by the branching of section 59, and terminal sections 64 and 72 by the branching of section 60. As is apparent from Fig. 7 none of the terminal sections needs to be bent or inclined, as in the case of a vessel of circular cross section, in order that each section will feed an equal area.

The construction of regenerating kilns of the type here involved is well understood by those skilled in the art and for this reason I have shown in Figs. 5–7 only so much of the kiln as is necessary to an understanding of my invention. These kilns like the reactors with which they are employed, e. g. the reactor of Figs. 1–4, comprise a vertical series of horizontal baffles for maintaining the rate of downward catalyst flow substantially uniform across the chamber, the baffles, just as in the case of the reactors, being positioned near the bottom of the chamber above the catalyst discharge port. The kilns differ from the reactors principally in that they contain in addition to a greater number of grid members, a plurality of tube bundles through which is circulated a heat exchange medium for temperature control. In the regenerators, air for burning the catalyst is introduced and distributed by some of the grids, while the remainder serve to collect and remove the combustion gases resulting from the burning.

The sections in the same horizontal plane, for example, sections 53—56 in Figs. 5–7, sections 31—34 in Figs. 1–4, or the terminal sections in any of the figures may be considered as constituting a tube group. I have found that the number of tube groups shown in the drawings provides for successful operation but where the available space permits additional groups of tubes may be added or interposed. It is essential in order that disturbances created at the points of branching will be properly dissipated, that the length of each section formed at such points be not less than three times its diameter. It is further essential to the end of preventing hold-up of catalyst in any of the tubes, that the angle of inclination of each inclined tube be not less than 45°.

Solid catalysts employed in the cracking of hydrocarbon oils vary considerably in particle size, the variation tending to become progressively greater, due primarily to non-uniform attrition, the longer the catalyst is used, and this obtains despite the use of ellutriators, or the like, for continuously removing fines. My invention minimizes non-uniform distribution of particle sizes giving rise to "channelling" and thereby provides for improvements in yields and quality of products from reactors and for improved oxygen utilization and temperature distribution when applied to regenerating kilns. In regenerating kilns it further provides for more uniform reactivation of catalyst.

I claim:

In a vertical shaft chamber for contacting a granular solid of varying particle size with an aeriform fluid, the granular solid being passed downwardly through the chamber, the combination with baffling means in the lower portion of the chamber for maintaining the rate of downward flow of the granular solid substantially uniform across the chamber, of a system of tubes associated with the upper portion of the chamber for distributing the fine and coarse particles of the granular solid uniformly over a horizontal section of the chamber, said system of tubes being characterized in that each tube in the system is disposed, if not vertically, at an angle of inclination greater than 45° and in that it comprises together with a primary tube connected with a source of supply of the granular solid, an even number of terminal tubes therebelow and mediately connected thereto the lower ends of which are in substantially the same horizontal plane and constitute ports opening to the chamber and serving substantially equal areas thereof, each of said terminal tubes representing one of two branching arms of a tube thereabove, that tube being one of a group of tubes above the terminal tubes, each tube in such group representing one of two branching arms of a tube thereabove, that tube in turn being one of a group of tubes above the group of tubes above the terminal tubes, and so on until the number of tubes in a group is two, both being branches of the primary tube, said system of tubes being further characterized in that the length of each tube below a point of branching is at least equal to three times its diameter and in that the tubes representing branching arms of a tube thereabove in addition to forming equal angles with the horizontal form equal angles with such tube in all planes.

KENNETH M. WATSON.

No references cited.